Figure 1:
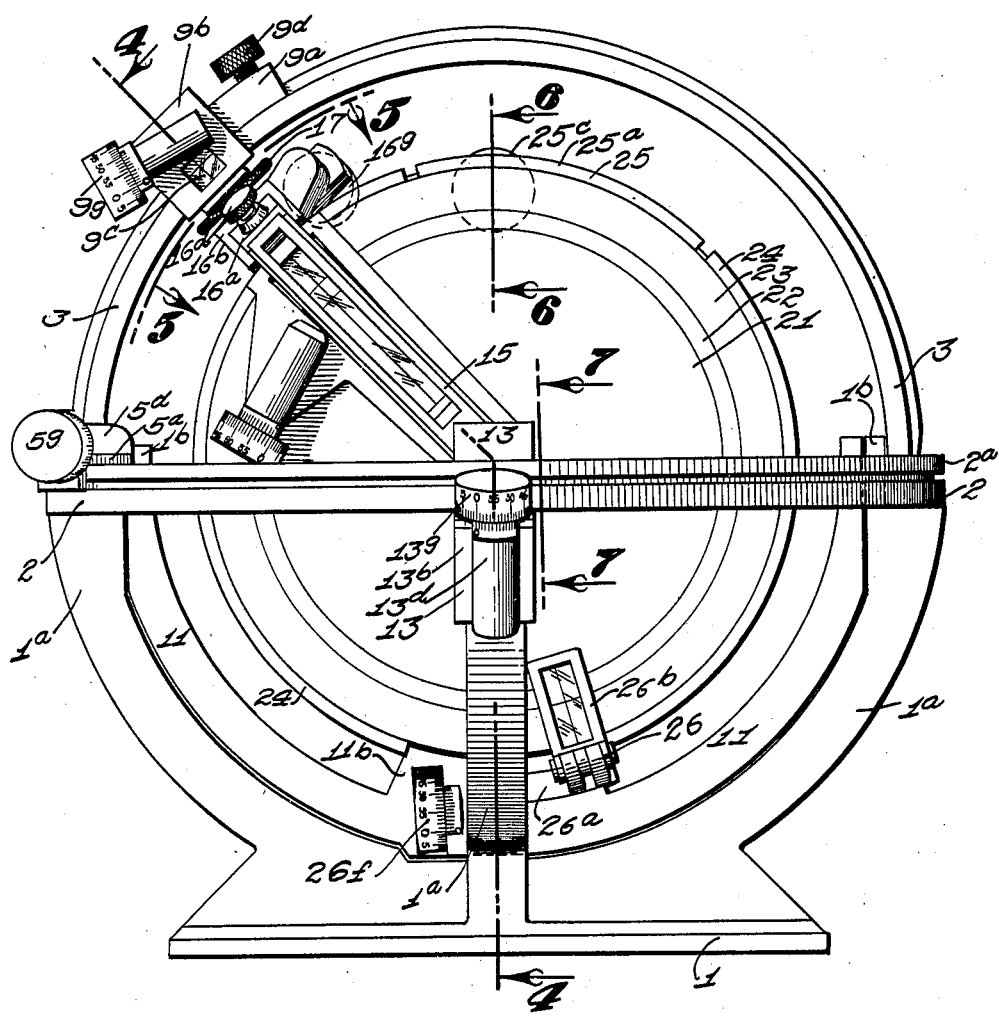

Aug. 25, 1936.  E. H. ASHLOCK  2,051,810
NAVIGATION INSTRUMENT
Filed Feb. 7, 1934  6 Sheets-Sheet 1

Inventor
ERNEST H. ASHLOCK
By A. B. Bowman
Attorney

Aug. 25, 1936.  E. H. ASHLOCK  2,051,810
NAVIGATION INSTRUMENT
Filed Feb. 7, 1934   6 Sheets-Sheet 2

Inventor
ERNEST H. ASHLOCK
By A. B. Bowman
Attorney

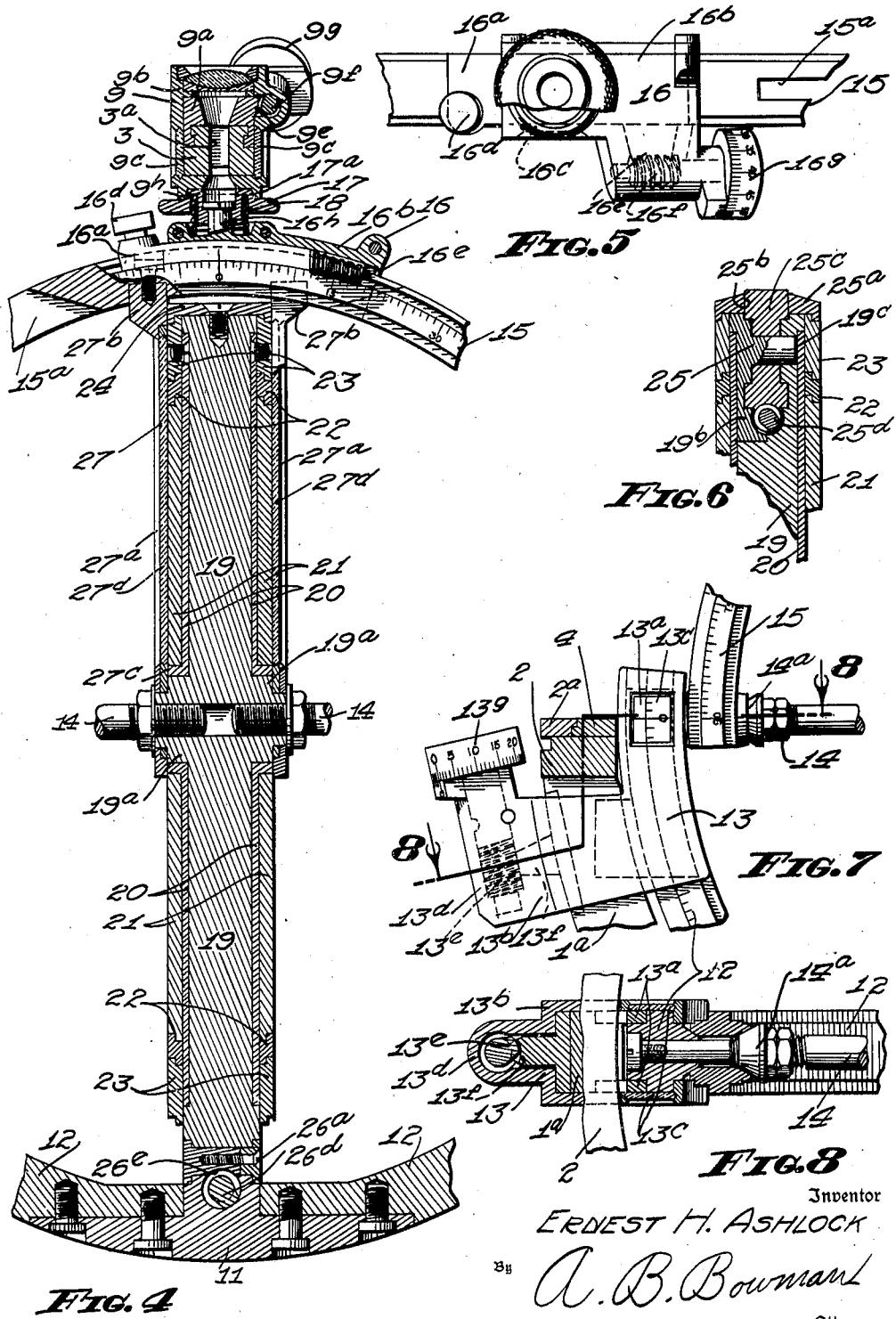

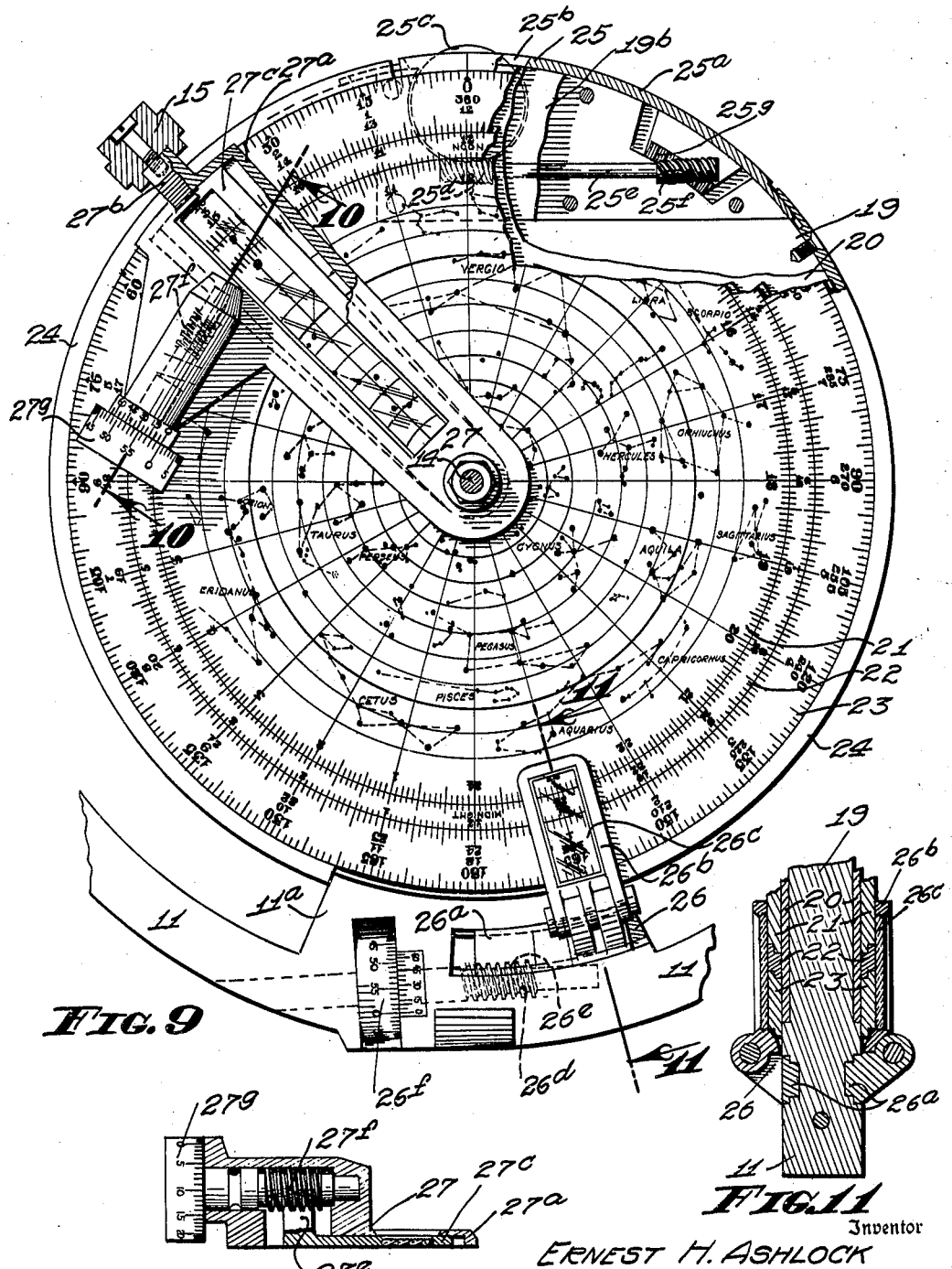

Aug. 25, 1936.  E. H. ASHLOCK  2,051,810
NAVIGATION INSTRUMENT
Filed Feb. 7, 1934  6 Sheets-Sheet 6

Inventor
ERNEST H. ASHLOCK
A. B. Bowman
Attorney

Patented Aug. 25, 1936

2,051,810

UNITED STATES PATENT OFFICE 2,051,810

NAVIGATION INSTRUMENT

Ernest H. Ashlock, San Diego, Calif., assignor of one-half to Frank E. Croucher, San Diego, Calif.

Application February 7, 1934, Serial No. 710,127

17 Claims. (Cl. 33—1)

My invention relates to navigation instruments, and the objects of my invention are:

First, to provide a navigation instrument whereby the azimuth and altitude of a celestial body may be obtained simultaneously without reference to the horizon and with the elimination of corrections for dip and for semi-diameter;

Second, to provide a navigation instrument which represents graphically the relationship of altitude, azimuth, time, declination, latitude, and longitude, and thereby solve graphically the spherical triangle;

Third, to provide a navigation instrument which permits immediate solution for latitude and for longitude from a given altitude, azimuth, declination, and Greenwich hour angle; similarly, for a given declination and assumed latitude and longitude, the azimuth and altitude for any hour angle may be immediately obtained; or further, other combinations of known and unknown elements may be solved, as for instance, the great circle course and distance from a known point of departure to any destination;

Fourth, to provide a navigation instrument which presents a visualization of the heavenly bodies in their relationship to time and position of the observer, thus serving as a ready means for star identification;

Fifth, to provide a navigation instrument with which a conventional compass may be incorporated;

Sixth, to provide a navigation instrument in which the azimuth and altitude indicators may be separated from the remainder of the instrument and be mounted upon a conventional compass whereby the altitude and azimuth of a given heavenly body may be determined and the indicators replaced on the instrument for completion of the calculation;

Seventh, to provide a navigation instrument of this class which incorporates a novel finder adapted to be focused on the heavenly body and operated in conjunction with the azimuth and altitude indicators;

Eighth, to provide a navigation instrument which is so arranged that comparisons or compensations between local time, local apparent time, mean time, and sidereal time, may be readily and quickly made, and Ninth, to provide on the whole a novelly constructed navigation instrument which is durable, efficient and accurate in its action, and which will not readily deteriorate or get out of order.

Figure 2:
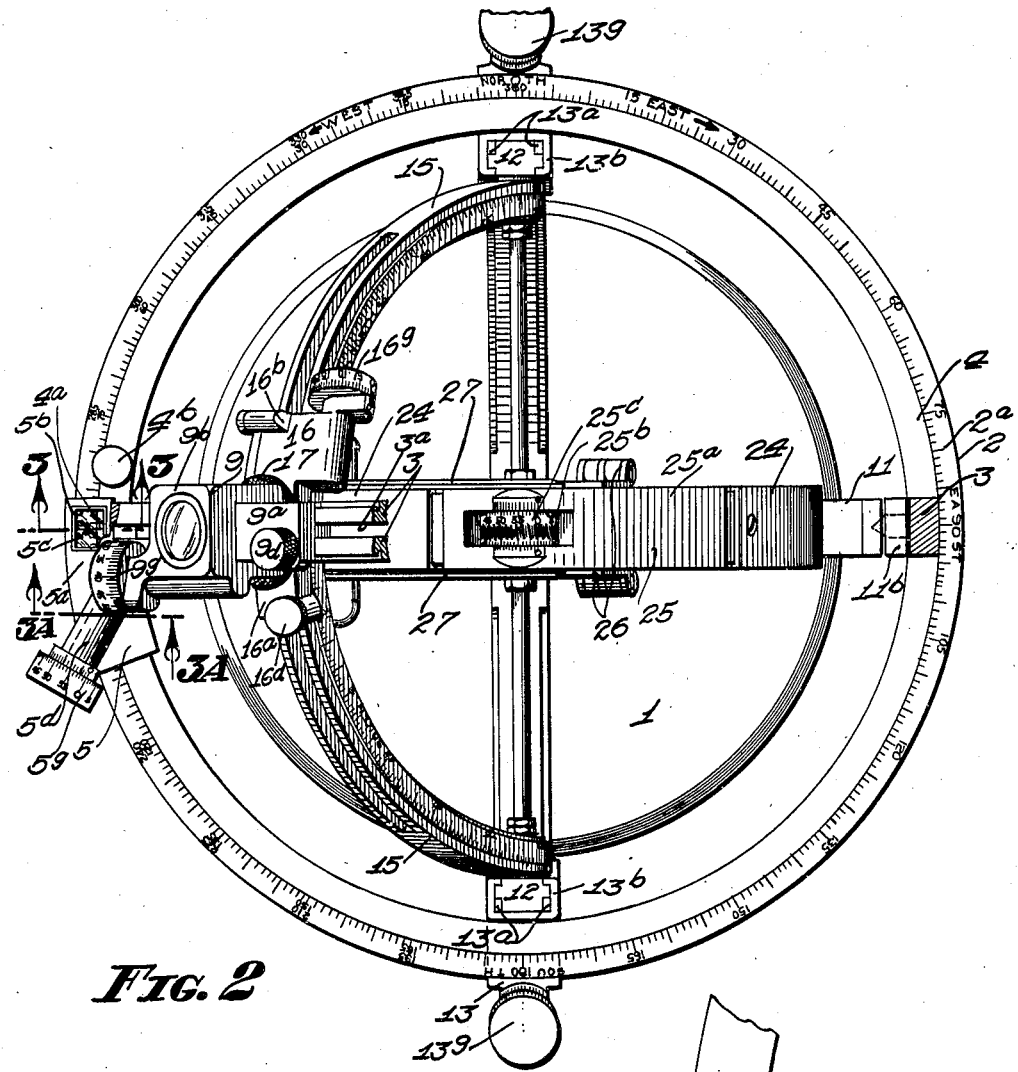
Figure 3A:
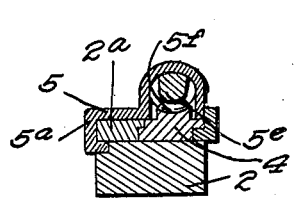
Figure 3:
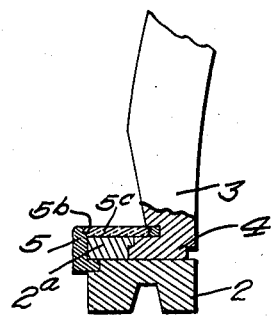
Figure 12:
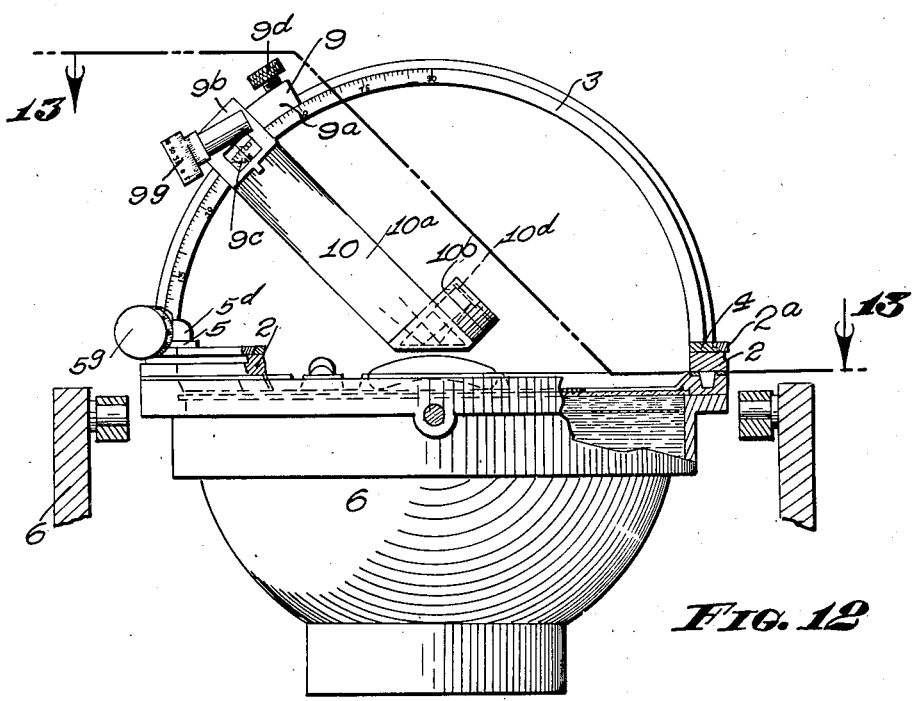
Figure 13:
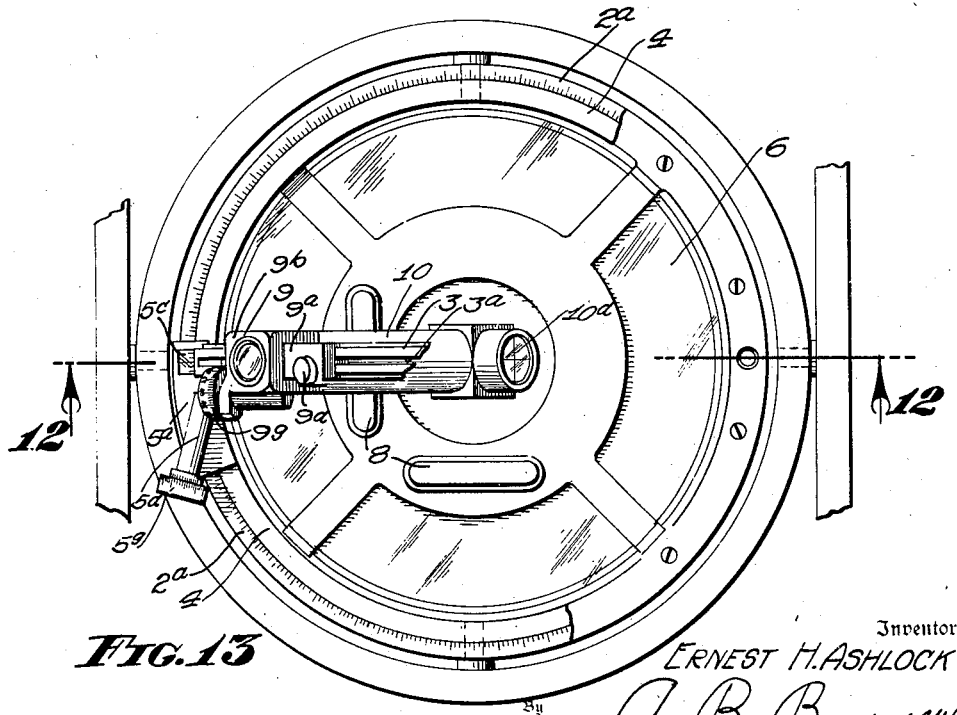
Figure 14:
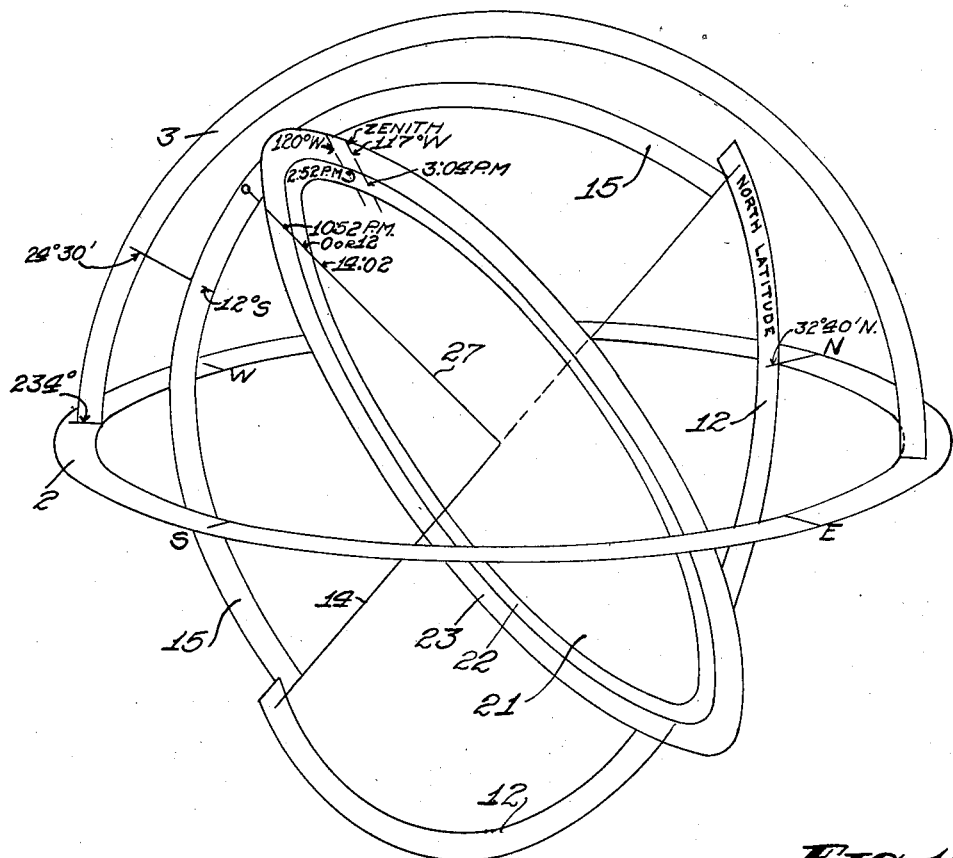

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of the navigation instrument set on the zero line of latitude and longitude and designating the sun at such point at about three o'clock in the afternoon; Fig. 2 is a plan view thereof; Fig. 3 is a fragmentary sectional view of the azimuth and altitude band taken through 3—3 of Fig. 2; Fig. 3A is a similar fragmentary sectional view approximately through 3A—3A of Fig. 2; Fig. 4 is an enlarged sectional view substantially through 4—4 of Fig. 1, with parts and portions shown in elevation; Fig. 5 is a fragmentary elevational view of the declination band and micrometer adjustment members taken substantially from the line 5—5 of Fig. 4; Fig. 6 is a fragmentary sectional view of the longitude indicating means taken through 6—6 of Fig. 1; Fig. 7 is a fragmentary elevational view of the latitude indicating means with the azimuth band in section taken along the line 7—7 of Fig. 4; Fig. 8 is a sectional view thereof through 8—8 of Fig. 7; Fig. 9 is an elevational view of the star chart, time band and longitude band together with the associated mechanism with parts and portions broken away and in section or shown fragmentarily to facilitate the illustration; Fig. 10 is a fragmentary sectional view of the micrometer adjustment means associated with the indicating means for reading the star chart, hour band and longitude band, the section being taken through 10—10 of Fig. 9; Fig. 11 is a fragmentary sectional view of the adjustment mechanism for facilitating relative positioning of the star chart, hour band and longitude band, the view being taken through 11—11 of Fig. 9; Fig. 12 is a reduced partial sectional partial elevational view of the azimuth and altitude indicators and the focusing mechanism as they appear when mounted upon a compass, the compass being shown fragmentarily; Fig. 13 is a partial sectional partial plan view thereof, and Fig. 14 is a diagrammatical perspective view illustrating the manner in which the instrument is used.

Similar characters of reference refer to similar parts and portions throughout the several views of the drawings.

Base 1, azimuth or horizon indicator 2, altitude indicator 3, supporting band 4, azimuth micrometer 5, compass instrument 6, levels 8, altitude micrometer 9, sighting tube 10, journal bracket 11, latitude indicating arms 12, latitude micrometer 13, journal means 14, declination indicator 15, declination micrometer 16, centering member 17, spring 18, fixed plate 19, backing plates 20, star chart disks 21, hour indicating bands 22, longitude indicating bands 23, retainers 24, longitude reference micrometer 25, disk and band setting micrometer 26, and longitude and hour micrometers, constitute the principal parts and portions of my navigation instrument.

The navigation instrument is mounted on a base 1 which includes two semi-circular upwardly curved portions intersecting each other at right angles to form four quadrant arms, designated 1a. The four arms are arranged opposite the north, east, south and west designating portions of the instrument. The upper extremities of the four arms 1a removably support by a suitable dowel and pin arrangement an azimuth or horizon indicator 2. The azimuth indicator is in the form of a ring.

An altitude indicator 3 in the form of a semicircle is supported diametrically upon and in an upright position over the azimuth indicator. The altitude indicator is secured to a supporting band 4 which fits in a bearing formed at the radially inner upper side of the azimuth indicator so that the altitude indicator may be rotated 360° with respect to the azimuth indicator. The azimuth indicator is provided at its upper side outwardly from the supporting band with a removable ring 2a fixed to said azimuth indicator and having a stepped inner periphery conforming to a stepped outer periphery of the supporting band so as to retain the supporting band in position on the azimuth indicator. (See Fig. 3.)

At one extremity the altitude indicator is recessed at its outer periphery to expose the outer margin of the supporting band 4, as shown best in Fig. 3. At this place the supporting band 4 is provided with a center mark 4a. The center mark 4a is adapted to register with a scale which is marked off on the ring 2a. This indicator is marked from a zero or north position 360° through the east position and likewise 180° through the west position.

In order to facilitate and increase the accuracy of the reading between the azimuth and altitude indicators, there is provided an azimuth micrometer 5. Said micrometer comprises a frame 5a which fits over the azimuth indicator outwardly from the altitude indicator and which extends arcuately to one side of said altitude indicator. An aperture 5b is provided in the frame 5a outwardly from the altitude indicator. A glass or other transparent member 5c is fit into the aperture flush with the under side of the frame so as to rest on the azimuth indicator scale and preferably overlapping the center mark 4a. The transparent member 5c is provided with a radiating scratch line centered in its under side so as to coact with the azimuth indicator scale.

At one side the frame 5a supports across its upper side an angularly extending journal 5d (Fig. 2) which receives a shaft including a worm 5e. The worm 5e coacts with a series of teeth 5f projecting upwardly from the supporting band 4. The worm 5e is operated by a hand wheel 5g with suitable degree or other scale markings on its periphery. The micrometer need not move more than the distance between the markings of the azimuth indicator scale. When the micrometer is set at zero the hair line on the transparent member 5c is centered with mark 4a of the supporting hand and altitude indicator. After the altitude indicator has been set in the desired position the micrometer is moved one way or the other so that the distance between the location of the hair line and the adjacent marking of the azimuth indicator scale can be determined. It should be noted here that this arrangement eliminates the need of extensive gear teeth and at the same time facilitating rapid approximate setting of the azimuth indicator and altitude indicator. A suitable set screw 4b is carried by the supporting band 4 so that it may be secured in any position relative to the azimuth indicator.

The azimuth indicator and altitude indicator are removable as a unit from the base 1 and are adapted to be positioned on a compass instrument 6. The compass instrument may be any conventional type such as the magnetic compass or gyroscope compass. The only change from the conventional arrangement is the provision of means for receiving the dowels carried by the azimuth indicator in order that said indicator may be set in the proper position on the compass instrument. The conventional compass is supported or hung in gimbals so that the face of the compass may be maintained horizontal. The azimuth indicator is mounted on the periphery of the compass itself so that it may be maintained in a horizontal position also. In order to ensure the level condition of the compass face, there are provided a pair of levels 8 shown best in Fig. 13 of the drawings which are mounted thereover in any suitable manner.

The altitude indicator carries an altitude micrometer 9 similar in its operation to the azimuth micrometer 5.

The altitude micrometer 9 comprises a slide 9a which fits on top of the altitude indicator. The slide is arcuate and is provided with inturned margins which fit in grooves provided along the sides of the altitude indicator. Embracing the slide 9a and the altitude indicator is a sleeve 9b. Said sleeve is slidable relative to the slide 9a as well as the altitude indicator. At each side the sleeve 9b is provided with apertures in which are mounted transparent members 9c. These members expose the axial sides of the altitude indicator and portions of the sides of the slide 9a, as shown best in Fig. 4. The slide 9a is provided with a thumb screw 9d so that the slide may be secured in any position along the altitude indicator. Said slide is also provided at one side with a series of teeth 9e. The sleeve 9b is provided with a casing portion at one side over the teeth 9e which receives a shaft having a worm 9f. Said shaft is controlled by a hand wheel 9g located at the side of the altitude indicator. This arrangement permits the micrometer adjustment of the slide relative to the sleeve. The sides of the altitude indicator are marked off from its extremity having the micrometer 5 to the center in order to form scales. These scales read from zero to 90° and coact with hair line markings provided on the transparent members 9c in the manner described relative to the azimuth micrometer 5.

The altitude indicator is provided with a longitudinal slot 3a extending almost to its extremities. The sleeve 9b and slide 9a are provided with apertures which register with each other and with the slot 3a, these apertures being directed radially with respect to the altitude indicator. The sleeve 9b extends across the inner periphery of the altitude indicator and is provided with an annular seat portion concentric with its aperture which is adapted to receive a sighting tube 10. The sighting tube 10 is generally L-shaped the longer leg, designated 10a, joining the azimuth micrometer and extending radially inwardly towards the center of the circle defined by the altitude indicator; and the shorter leg, designated 10b, extending at right angles therewith. At the juncture of the two legs of the sighting tube there is mounted a prism or other reflecting member having a reflecting surface intersecting the center of curvature of the altitude indicator. The extremity of the shorter leg 10b is provided with a ground glass panel 10d having a cross line thereon. Within the tube 10a there are mounted suitable lenses for concentrating the light which passes through the altitude micrometer and slot 3a so that such light is focused at a point by the time it reaches the ground glass 10d. With this arrangement one may easily and quickly determine when the sun or other illuminated body is in direct alinement with the tube 10a. If such sighting is made when the azimuth band or indicator is setting in the proper position on the compass and is level, the position at which the light of the sun or other illuminated body is focused will automatically give the altitude as well as the azimuth of such body. When such reading has been obtained the thumb screws 4b and 9d are tightened. After this is done the sighting tube is removed and the altitude and azimuth indicators are replaced on the base 1.

The arms 1a disposed at the east and west positions of the instrument are provided with upwardly directed lugs 1b which extend inside of the azimuth indicator. A semi-circular journal bracket 11 is rotatably supported between the lugs 1b. The axis of movement of the journal bracket is in the plane of the upper surface of the azimuth indicator and hence intersects the center of the altitude indicator. Secured midway between the extremities of the journal bracket 11 at right angles therewith is a pair of oppositely directed latitude indicating arms 12 in the form of quadrants. Said latitude indicating arms 12 are in alinement with the arms 1a of the base which extend to the north and south positions of the instrument. The latitude indicating arms are marked off on opposite sides beginning with zero at the extremities. The distance between the zero markings of the two indicating arms is exactly 180°. Thus when one of the latitude indicating arms is positioned with its zero mark opposite the upper surface of the azimuth indicator the other arm is likewise positioned with its zero marking flush with the surface of the azimuth indicator. The markings on these latitude indicating arms form scales for designating the latitude, the latitude whether north or south being determined by the distance which the arm extends above the azimuth indicator.

In order to facilitate the reading of the latitude there is provided a latitude micrometer 13, which is shown best in Figs. 7 and 8. One latitude micrometer is provided for each latitude indicating arm and may be designed to read on both sides of said arm. Each latitude micrometer 13 comprises a pair of bracket members 13a secured to opposite sides of an arm 5a and having arcuate portions adapted to fit in grooves extending along the outer margins of the corresponding latitude indicating arm. Said brackets 13a are provided with scratch marks indicating the plane of the azimuth indicator 2. Each latitude micrometer includes a frame 13b which embraces the corresponding arm and brackets 13a. Opposite the sides of the arm the frame 13b is provided with apertures in which are mounted transparent panels 13c. Said panels are provided with scratch lines at their inner sides which coact with the scales on the latitude indicating arms and brackets 13a. The frame 13b forms a sliding connection with the latitude indicating arm and extends radially outwardly therefrom underneath the azimuth indicator and around the corresponding arm 1a. At the outer side of the arm 1a the frame 13b is provided with a casing portion 13d which journals a shaft including a worm 13e. The worm coacts with a series of teeth 13f secured to the outer side of the arm 1a so as to effect a micrometer adjustment of the frame with respect to the brackets 13a and the scales on the latitude indicating arm. The worm 13e is operated by a hand wheel 13g having suitable scale markings thereon.

The extremities of the latitude indicating arms 12 are connected by a journal means 14 the axis of which is in the plane of the zero markings on the latitude indicating arms and hence the plane of the azimuth indicator as well as intersecting the center of the altitude indicator. The journal means 14 is provided with journal portions 14a adjacent each latitude indicating arm which revolubly support a declination indicator 15. The declination indicator 15 is in the form of a half circle of somewhat smaller diameter than the altitude indicator and by reason of its connection with the latitude indicating arms 12 rotates at right angles to the center of movement of said arms.

Midway between its extremities the declination indicator is provided with a zero point at its opposite sides from which extend scale markings reading towards 90° in either direction from the center or zero point. The declination indicator is provided with a declination micrometer 16 for aiding in the reading of the declination scales.

The declination micrometer comprises a slide 16a which fits over the outer periphery of the declination indicator and is provided at its margins with arms which interlock in grooves extending along the sides of the indicator. A sleeve 16b embraces the slide 16a and sides of the declination indicator. Said sleeve is provided with apertures in its sides in which are mounted transparent members 16c so as to expose the declination scales and a portion of the slide. The slide 16a is provided with a thumb screw 16d for securing said slide in any position along the declination indicator. Said slide is also provided at one side with a series of teeth 16e. Opposite the teeth 16e the sleeve 16b forms a casing portion which journals a shaft including a worm 16f, as shown by dotted lines in Fig. 5. The shaft and worm is operated by a hand wheel 16g having scale markings thereon whereby a micrometer adjustment between the sleeve 16b, slide 16a and the declination scales may be obtained.

In the plane defined by the scratch lines in the two transparent members 16c and centered above the declination indicator is a post 16h which may form an integral part of the sleeve 16b. Said post reciprocally supports a centering member 17. The centering member is in the form of a flat wheel with a knurled periphery and with a relatively large slightly tapered centering boss 17a projecting radially outwardly therefrom. The centering member is held in an axially outer position by means of a spring 18. The micrometer 9, that is the sleeve 9b thereof, is provided at its radially inner side in centered relation with the aperture through the micrometer with a centering recess 9h which is adapted to coact with the centering boss 17a. The recess and boss are so arranged that the micrometers 9 and 16 may rotate with respect to each other about an axis which is the radius line along which the sun or other heavenly body is sighted by the sighting tube 10. The centering member 17 has sufficient movement that its periphery may be engaged and moved radially inwardly to clear the altitude micrometer 9. The operation of the altitude and declination micrometers will be set forth in more detail hereinafter.

The journal bracket 11 is joined or is integrally secured at its central portion to a fixed plate 19 which is disposed in the plane of the journal bracket. The fixed plate is spaced from the arms of the journal bracket except at its connecting portions therewith a sufficient distance to permit passage of the declination indicator 15. Inasmuch as it is seldom necessary to shift the declination indicator to a position below the fixed plate a substantial connection between said plate and the bracket may be provided.

The journal means 14 may be divided into two arms which are secured into opposite sides of the fixed plate so that the journal means may aid in bracing the fixed plate. The fixed plate is provided at its opposite sides with hub portions 19a which journal a pair of backing plates 20. These plates extend almost to the periphery of the fixed plate. The backing plates 20 are provided with axially outwardly directed journal portions at their inner peripheries. The journal portion of each backing plate revolubly supports a star chart disk 21. Each star chart disk 21 is provided with a stepped outer periphery so arranged that the greater diameter of the disk is adjacent the backing plate. An hour indicating band 22 is journaled around the periphery of each star chart disk, as shown best in Fig. 4, and conforms to the periphery thereof. The outer periphery of each hour indicating band is likewise stepped so that its axially inner side has the greater diameter. A longitude indicating band 23 is secured to each backing plate at its outer periphery. Each longitude indicating band is so arranged as to overhang the adjacent hour indicating band. With this arrangement the two bands 23 and 22 and the star chart 21 on each side of the fixed plate are held in rotatable relation with each other and with the fixed plate. The particular arrangement described enables the two bands and the disk to be revolved in unison without disturbing the adjustment between them as will be brought out hereinafter.

The outer periphery of each longitude indicating band is also stepped so that its axially inner side has the greater diameter. Wherever possible around the fixed plate 19 there are provided retainers 24 which fit over the periphery of the fixed plate and are provided with internal flanges along their axial sides which overhang and engage the longitude indicating bands so that these bands are held in position against the fixed plate but in revoluble relation therewith.

The star chart disk on one side of the fixed plate is provided with a north latitude star chart. Such a chart is arranged so that the North Star occupies the center of the chart and the other major stars are grouped in relation thereto. With this arrangement the declination of the various stars is indicated on the star chart by a series of concentric rings, the stars over the Equator having zero declinations and the North Star having a 90° declination. The arrangement of the star chart is shown fragmentarily in Fig. 9.

On the opposite side the star chart represents the stars as arranged in the Southern Hemisphere. On the instrument the chart representing the North Hemisphere is located on the side of the fixed plate opposite from the north position so that in reading the chart one looks towards the north position. Similarly the chart for the Southern Hemisphere is arranged on the north side of the fixed plate.

The periphery of each star chart is marked off in degrees of a circle from 1 to 24 and fractions thereof to facilitate the reckoning of sidereal time. Also opposite each hour mark there are provided light radiating lines. The hour indicating band surrounding each chart is marked off from zero to 24 in a clockwise direction. In addition an auxiliary marking from zero to 12 beginning at 12 on the 24-hour clock scale is provided.

Each longitude indicating band is provided with scale markings at its outer and inner peripheries which are duplicates. The scale markings are divided into twenty-four units and between these scale markings there is provided indicia one set of which reads clockwise in degrees, the other of which reads counter-clockwise in degrees, preferably in 15° intervals. Also these points are designated by numerals reading from 1 to 12 at the 180° point in a counter-clockwise direction, and from zero to 12 in the same direction from the 180° point back to the zero or 360° point. The function of the longitude indicating band, hour indicating bands and star chart disks will be brought out in more detail hereinafter.

It is desirable in some calculations to accurately read the longitude scale on the longitude indicating band with reference to a top center on the fixed plate 19. For this purpose there is provided a longitude reference micrometer 25 (see Fig. 6). Said micrometer includes an arcuate slide member 25a similar in section to the retainers 24 and provided at its ends with means for slidably connecting with said retainers, as shown in Fig. 9. Said slide extends over the top of the fixed plate and is here provided with a slot 25b. The fixed plate 19 is provided with a removable panel 19b at its upper portion which includes a stem 19c adapted to journal a micrometer wheel 25c forming a part of the longitude reference micrometer. Said wheel is disposed at the top center of the fixed plate and journals on an axis parallel with the axis through the fixed plate. The periphery of the wheel 25c is provided with suitable gear teeth which engage a worm 25d mounted on a shaft 25e journaled between the removable panel 19b and the body of the fixed plate. Said shaft 25e extends laterally to the periphery of the fixed plate where it is provided with a second worm 25f. Here the fixed plate is slotted to receive a lug projecting radially inwardly from the slide 25a. Said lug is provided with gear teeth 25g adapted to coact with the last mentioned worm. Thus by moving the wheel 25c the shaft 25e is rotated. At opposite sides of the wheel 25c the slide 25a is provided with a center marking which is adapted to register with the scales provided around the outer periphery of the longitude indicating bands. Rotation of the wheel advances or retards the slide with respect to the fixed plate so that accurate calculations between adjacent markings on the longitude indicating band may be readily and quickly made; there being provided suitable scale markings on the wheel 25c. (See Fig. 2.)

In compensating for various time reckonings such as the difference between mean and apparent time, or between sun and sidereal time, or between local and apparent time, etc., it is necessary to adjust the disk and the two bands relative to each other. The bands may be in any position with respect to the fixed plate when this is done and for convenience there is provided at the bottom of the fixed plate a disk and band setting micrometer 26.

The disk and band setting micrometer 26 is mounted within the web, designated 11a, which joins the fixed plate with the journal brackets 11. Said web is slotted arcuately to receive a slide member 26a having portions disposed at opposite sides of the web. These portions are secured preferably through hinge means to a pair of frames 26b adapted to extend on opposite sides of the bands and disks. The frames need only overlap the scale portions provided at the peripheries of the star chart disks. Each frame is provided with an aperture in which is mounted a transparent member 26c having a centered scratch line disposed along a radius line of the disks and bands. The journal bracket is provided with a relatively deep socket extending longitudinally therewith so as to intersect the lower portion of the slot provided in the web 11a. Said socket journals a shaft which includes a worm 26d adapted to engage teeth 26e provided on the under side of the slide member 26a. The worm is operated by a hand wheel 26f which is mounted in a slot traversing the web and journal bracket so that the sides of the hand wheel 26f are exposed. Said wheel is provided with micrometer markings thereon. In operation one of the disks or charts is set according to the hair line in the transparent member 26c with the hand wheel 26f at its zero position, then the said hair line is moved the desired fraction of a degree one way or the other and the desired disk or band is moved in alinement therewith. Once the bands and disks are properly set with respect to each other they may be shifted in unison and the friction between the several bands and disks is sufficient to prevent disturbance of such adjustment, particularly in view of the backing plates 20.

It is desirable to read the position of the declination indicator with respect to the bands and disks provided on the fixed plate. For this purpose there is provided a longitude and hour micrometer 27 for each side of the fixed plate. Each micrometer 27 comprises an elongated frame 27a which is journaled at one end about the journal means 14 and which rests against the face of the disks and bands at the corresponding side of the fixed plate. Said frame is provided with a lug 27b which extends to the declination indicator and is secured thereto, as shown best in Figs. 4 and 9. The frame 27a is provided with an elongated slot therein. Also the side of each frame 27a facing the fixed plate is recessed except for its marginal portion to receive a relatively flat indicating member 27c. Said member is likewise journaled about the same axis as the corresponding frame 27a but is capable of slight arcuate movement with respect to said frame. Each indicating member 27c is provided with an elongated slot therein in which is mounted a transparent panel 27d. Said panel is provided with a radiating and centered hair line. Each indicating member is provided with an arcuate arm extending from one side thereof, which arm is provided at its extremity with gear teeth 27e (Fig. 10). Each frame 27a is provided with a casing portion in which is journaled a shaft including a worm 27f adapted to coact with the gear teeth 27e. The worm 27f is controlled by a hand wheel 27g having micrometer markings thereon. In order to facilitate reading of the micrometer 27 the declination indicator 15 is provided at opposite sides of its central portion with longitudinally extending slots 15a.

The micrometer 27 may be used to accomplish the function of the micrometer 26 but by reason of the former's association with the declination indicator it is sometimes more convenient to use the micrometer 26. Similarly the micrometer 26 may be used to accomplish the function of the micrometer 25 providing that the hair line register with the markings on the longitude band when the hand wheel 26f is at zero, and the markings when so positioned register with the top center mark on the slide member which would be fixed.

In order to facilitate the illustration, the instrument as illustrated in Figs. 1 to 13, inclusive, has been shown as designating the zero latitude or Equator at the zero longitude line or the Greenwich line and at three o'clock in the afternoon. In order to more fully illustrate the operation of the instrument the diagrammatical view Fig. 14 illustrates the position of the instrument when in a more customary position. In this view the altitude indicator 3 has a bearing in azimuth of 234° as measured clockwise from the north position on azimuth ring 2. The altitude indicator 3 has a reading of 24° 30'. This means that the sun or other heavenly body is in the plane of the altitude indicator which plane is 234° clockwise from the north position, and is 24° 30' above the horizon. These two positions are obtained by observation or are set arbitrarily as explained hereinafter. On November 8th the declination of the sun, that is the distance of the sun south of the Equator is approximately 12°. This is determined from the Nautical Almanac and the declination indicator is so set and the micrometer is brought into registry with the altitude indicator. At the time of the reading it is 10:52 P. M. at Greenwich so the longitude band is turned until this position of 10:52 is centered with respect to the declination indicator. The top center of the longitude band then designates 117° west which is the longitude at the point of observation. Now if the 12 noon position on the hour band is moved until it registers with the Greenwich time of 10:52, that is in the plane of the declination band, the local time at the 117th meridian west, that is the top center of the longitude band will be 3:04 P. M. Now time at the 117th meridian west is reckoned from the 120th meridian west, hence the indicated time at this position will be 2:52 P. M. or the time registered opposite the 120° point. On November 8th the difference between sidereal and sun time is approximately three hours and ten minutes, therefore, the chart may be rotated until the fourteen hour and two minute position is opposite the new position of the hour band and the position of the stars on the chart relative to the longitude will be indicated.

Because of the tilting of the axis of the declination band and its angular position the true latitude is indicated by comparison of the latitude arms with the surface of the azimuth indicator.

Several of the various problems which the navigation instrument is capable of solving are worked as follows:

To determine an unknown longitude and latitude of the observer: The altitude and azimuth indicators are placed on a compass so that the azimuth indicator has its north or zero position in registry with the north position of the compass and allowance is made for error or deviation of the compass. The altitude indicator is rotated on its supporting band and the altitude micrometer is shifted together with the sighting tube until the star or sun's rays are focused at the intersection of the hair line on the ground glass 10d. The azimuth micrometer and altitude micrometer are then set. The azimuth and altitude indicators are then placed on the base 1. First, however, the sighting tube is removed. The declination micrometer is moved and the declination indicator is shifted until the centering member 17 registers with the socket in the altitude micrometer 9. In so doing the latitude indicating arms are moved in connection with the declination indicator so as to indicate the latitude. The Greenwich time is then set with respect to the longitude band by operation of the hour band and said longitude band and the two bands are shifted in unison so as to register with the hair line of the micrometer 27. The markings of the longitude band opposite the top center point of the fixed plate will give the longitude. Other times besides the Greenwich time may be used by proper adjustment of the bands and disks. When using the star chart in conjunction with night observation the proper star should approximately aline with the hair line of the micrometer 27. This affords a check as to the location of the star so that any error due to observation of the wrong star can be quickly detected.

To obtain the altitude and azimuth for given hour angles: The latitude arms are set to the assumed latitude, the declination band is moved to the desired hour angle, the declination micrometer is set for the desired declination, whereupon the altitude indicator and its micrometer is moved until the centering member 17 is in proper registry; whereupon reading on the azimuth scale and on the altitude scale will give the required answer.

To obtain the time an object will be on a certain bearing: The instrument is set for the assumed latitude and declination, the altitude indicator is moved to the desired bearing, the altitude micrometer and declination indicator are then shifted until the centering member 17 is in proper registry with the altitude micrometer; whereupon reading on the longitude indicator will give the time and reading on the altitude indicator will give the altitude.

To find great circle course and distance: Set the latitude arms and the longitude indicator so that they designate the point of departure, then set the declination micrometer for the latitude of declination, then bring the declination indicator to the longitude of declination with respect to the longitude band, then bring the altitude micrometer into registry with the centering member 17; whereupon the bearing obtained by the azimuth micrometer on the azimuth scale gives the great circle course. The distance in degrees of the altitude micrometer times sixty which is the number of miles to a degree of arc will give the distance in miles of such course.

To find bearing of stars: Bring the local hour angle on the time or hour band opposite the longitude on the longitude band, turn the chart so as to bring zero of sidereal time plus the conversion of time (that is the difference between sun and sidereal time) opposite the 12 midnight point on the time band. The position of the stars on the chart are now set for the meridian and for local hour angles.

To identify a star: Set the instrument for the desired altitude and longitude, set the micrometers 5 and 9 to the desired azimuth and altitude reading, swing the declination indicator and move the declination micrometer so as to aline with the altitude micrometer. The immediate declination of the star and its hour angle may be read. Move the star chart as in the preceding paragraph so as to bring the hour angle and sidereal scale into proper relationship, follow down the hair line of the micrometer 27 to the declination of the star as marked on the star chart. In the above operation the setting of the azimuth and altitude indicators may be accomplished from observation of the star as in the manner first described, that is in conjunction with the compass.

It is not absolutely necessary to observe the azimuth and altitude of the sun or star with this instrument as this subject matter may be obtained with the aid of a sextant, however it should be noted that with this particular instrument the azimuth and altitude of a given heavenly body is determined simultaneously, thereby greatly simplifying the observation and greatly reducing the mathematical calculations.

For various time relationship and hour angular relationship between various stars or sun and stars the star chart, hour band and longitude band together with the suitable micrometer, such as micrometer 27, may be used without reference to the remaining portions of the instrument.

As far as can be determined the navigation instrument herein described can be used in the solution of any problem of navigation dealing with celestial bodies and the time required for working such problems is reduced to a minimum. Furthermore, the instrument can be made accurate within the accuracy of the observation.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a navigation instrument, a circular azimuth indicator, a semi-circular altitude indicator having a diametrical axis of rotation normal to the plane of the azimuth indicator, said altitude indicator rotatably mounted on said azimuth indicator with its axis of rotation passing through the center of curvature thereof, a semi-circular latitude indicator rotatable around its center of curvature and mounted with the normal through its center coincident with a diameter of said azimuth indicator, a circular longitude indicator rotatable about the normal through its center, said longitude indicator supported with said normal concurrent with and normal to the axis of said latitude indicator, a semi-circular declination indicator pivoted on the axis of rotation of said longitude indicator with said axis concurrent with the center of curvature of said longitude indicator.

2. In a navigation instrument, an azimuth or horizon indicator, an altitude indicator revoluble thereon, a longitude indicator and a declination indicator revolubly mounted on axes at right angles to each other and relatively shiftable around said axes, means universally mounting said longitude indicator and declination indicator with respect to said azimuth indicator, said declination and altitude indicators being shiftable into traversing relation, and means for designating the traversing points on said declination and altitude indicators and a star chart disk revolubly mounted on concurrent axis with said longitude indicator and representing principal stars of the heavens radially projected on the celestial sphere.

3. In a navigation instrument, an azimuth or horizon indicator, an altitude indicator revoluble thereon, a longitude indicator and a declination indicator revolubly mounted on axes at right angles to each other and relatively shiftable around said axes, means universally mounting said longitude indicator and declination indicator with respect to said azimuth indicator, said means incorporating a latitude indicator revoluble about a fixed axis with respect to said azimuth indicator and a star chart disk revolubly mounted on concurrent axis with said longitude indicator and representing principal stars of the heavens radially projected on the celestial sphere.

4. In a navigation instrument, an azimuth or horizon indicator, an altitude indicator revoluble thereon, a longitude indicator and a declination indicator revolubly mounted on axes at right angles to each other and relatively shiftable around said axes, means universally mounting said longitude indicator and declination indicator with respect to said azimuth indicator, said means incorporating a latitude indicator revoluble about a fixed axis with respect to said azimuth indicator, said declination and altitude indicators being shiftable into traversing relation, and means for designating the traversing points on said declination and altitude indicators and a star chart disk revolubly mounted on concurrent axis with said longitude indicator and representing principal stars of the heavens radially projected on the celestial sphere.

5. In a navigation instrument, an azimuth or horizon indicator, an altitude indicator revoluble thereon, a longitude indicator and a declination indicator revolubly mounted on axes at right angles to each other and relatively shiftable around said axes, and means rotatably supporting said longitude and declination indicators about a common axis, said axis extending diametrically with respect to the declination indicator and coinciding with the center of curvature of said longitude designator, said means being journaled diametrically with respect to said azimuth indicator and at right angles to the axis of said longitude and declination indicators and a star chart disk revolubly mounted on concurrent axis with said longitude indicator and representing principal stars of the heavens radially projected on the celestial sphere.

6. In a navigation instrument, an azimuth or horizon indicator, an altitude indicator diametrically bridging said azimuth indicator and revoluble thereon about a diametrical axis coinciding with the center of curvature of said azimuth indicator, a longitude indicator and a declination indicator revolubly mounted on axes at right angles to each other and relatively shiftable around said axes, and means rotatably supporting said longitude and declination indicators about a common axis, said axis extending diametrically with respect to the declination indicator and coinciding with the center of curvature of said longitude designator, said means being journaled about a diameter of said azimuth indicators and at right angles to both the axis of the longitude and declination indicators and the axis of the altitude indicator and a star chart disk revolubly mounted on concurrent axis with said longitude indicator and representing principal stars of the heavens radially projected on the celestial sphere.

7. In a navigation instrument, an azimuth or horizon indicator, an altitude indicator diametrically bridging said azimuth indicator and revoluble thereon about a diametrical axis coinciding with the center and normal to the plane of said azimuth indicator, a longitude indicator and a declination indicator, means rotatably supporting said longitude and declination indicators about a common axis, said axis extending diametrically with respect to the declination indicator and passing through the center of curvature of said longitude indicator normal to the plane thereof, said means being journaled about a diameter of said azimuth indicator at right angles to both the axis of the longitude and declination indicators and the axis of the altitude indicator, and including a latitude indicator having said last mentioned diameter as an axis.

8. In a navigation instrument, an azimuth or horizon indicator, an altitude indicator revoluble thereon, a longitude indicator and a declination indicator revolubly mounted on axis at right angles to each other and relatively shiftable around said axis, means universally mounting said longitude indicator and declination indicator with respect to said azimuth indicator, said means incorporating a latitude indicator revoluble about a fixed axis with respect to said azimuth indicator, said longitude indicator being circular and carrying a scale means designating degrees of longitude with particular reference to hourly divisions, an hour band revolubly mounted in concentric relation with the longitude indicator, said hour band carrying an hour scale, and a device for designating radial lines common to said hour band and longitude indicator.

9. In a navigation instrument, an azimuth or horizon indicator, an altitude indicator revoluble thereon, a longitude indicator and a declination indicator revolubly mounted on axis at right angles to each other and relatively shiftable around said axes, means universally mounting said longitude indicator and declination indicator with respect to said azimuth indicator, said means incorporating a latitude indicator revoluble about a fixed axis with respect to said azimuth indicator, said longitude indicator being circular and carrying a scale means designating degrees of longitude with particular reference to hourly divisions, an hour band and star chart disk revolubly mounted in concentric relation with said longitude indicator, the hour band having a scale thereon representing the hourly divisions of a day, the star chart disk having graphic representations of the principal stars, and a device for designating radial lines common to said longitude indicator, hour band and star chart disk.

10. In a navigation instrument, an azimuth o horizon indicator, an altitude indicator revoluble thereon, a longitude indicator and a declination indicator revolubly mounted on axes at right angles to each other and relatively shiftable around said axes, means universally mounting said longitude indicator and declination indicator with respect to said azimuth indicator, said means incorporating a latitude indicator revoluble about a fixed axis with respect to said azimuth indicator, said longitude indicator being circular and carrying a scale means designating degrees of longitude with particular reference to hourly divisions, an hour band revolubly mounted in concentric relation with the longitude indicator, said hour band carrying an hour scale, a device for designating radial lines common to said hour band and longitude indicator, said declination and altitude indicators being shiftable into traversing relation, and means for designating the traversing points on said declination and altitude indicators, said designating device connected with said declination indicator to shift therewith about the longitude indicator to designate radius lines coinciding with the plane of said declination indicator.

11. In a navigation instrument, an azimuth or horizon indicator, an altitude indicator revoluble thereon, a longitude indicator and a declination indicator revolubly mounted on axes at right angles to each other and relatively shifable around said axes, means universally mounting said longitude indicator and declination indicator with respect to said azimuth indicator, said declination and altitude indicators being shiftable into traversing relation, means for designating the traversing points on said declination and altitude indicators, an hour band and star chart disk revolubly mounted in concentric relation with said longitude indicator, the hour band having a scale thereon representing the hourly divisions of a day, the star chart disk having graphic representations of the principal stars, and a device for designating radial lines common to said longitude indicator, hour band and star chart disk, said designating device connected with said declination indicator to shift therewith about the longitude indicator to designate radius lines coinciding with the plane of said declination indicator.

12. In a navigation instrument, a circular azimuth indicator, a semi-circular altitude indicator having a diametrical axis of rotation normal to the plane of the azimuth indicator, said altitude indicator rotatably mounted on said azimuth indicator with its axis of rotation passing through the center of curvature thereof, a semi-circular latitude indicator rotatable around its center of curvature and mounted with the normal through its center coincident with a diameter of said azimuth indicator, a circular longitude indicator rotatable about the normal through its center, said longitude indicator supported with said normal concurrent with and normal to the axis of said latitude indicator, a semi-circular declination indicator pivoted on the axis of rotation of said longitude indicator with said axis concurrent with the center of curvature of said longitude indicator, said declination and altitude indicators being shiftable into traversing relationship, means for designating the crossing points of said declination and altitude indicators, said longitude indicator carrying a scale means designating degrees of longitude with particular reference to hourly divisions, an hour band revolubly mounted in concentric relation with the longitude indicator, said hour band carrying an hour scale, and a device for designating radial lines common to said hour band and longitude indicator, said designating device connected with said declination indicator to shift therewith about the longitude indicator to designate radius lines coinciding with the plane of said declination indicator.

13. In a navigation instrument, a circular azimuth indicator, a semi-circular altitude indicator having a diametrical axis of rotation normal to the plane of the azimuth indicator, said altitude indicator rotatably mounted on said azimuth indicator with its axis of rotation passing through the center of curvature thereof, a semi-circular latitude indicator rotatable about a central axis normal to its plane and coincident with a diameter of said azimuth indicator, a circular longitude indicator rotatable about the normal through its center, said longitude indicator supported with said normal concurrent with and normal to the axis of said latitude indicator, a semi-circular declination indicator pivoted on the axis of rotation of said longitude indicator with said axis concurrent with the center of curvature of said longitude indicator, said longitude indicator carrying a scale means designating degrees of longitude with particular reference to hourly divisions, an hour band and star chart disk revolubly mounted in concentric relation with said longitude indicator, the hour band having a scale thereon representing the hourly divisions of a day, the star chart disk having graphic representations of the principal stars, and a device for designating radial lines common to said longitude indicator, hour band and star chart disk.

14. In a navigation instrument, a circular azimuth indicator, a semi-circular altitude indicator having its mid-diameter as an axis of rotation, said altitude indicator revolubly mounted on said azimuth indicator with its said axis of rotation concurrent with the center and normal to the plane of said altitude indicator, a compass adapted to support the azimuth indicator, level means for determining the level position of said azimuth indicator, and a sighting device shiftable upon said altitude indicator and extending radially inwardly therefrom to its center of curvature, said sighting device adapted to focus a beam of light from a heavenly body, and means for determining when the optical axis of said device is directed towards the body.

15. In a navigation instrument, a circular azimuth indicator, a semi-circular altitude indicator having its mid-diameter as an axis of rotation, said altitude indicator revolubly mounted on said azimuth indicator with its said axis of rotation concurrent with the center and normal to the plane of said altitude indicator, said azimuth indicator having a radiating scale thereon designating the horizontal directions, means for supporting said azimuth indicator in a horizontal plane with its scale in correspondence with the horizontal directions on the earth, and a sighting device shiftable upon said altitude indicator and extending radially inwardly therefrom to its center of curvature, said sighting device adapted to focus a beam of light from a heavenly body, and means for determining when the optical axis of said device is directed toward the body whereby upon rotating said altitude indicator to the horizontal direction of the heavenly body and shifting said sighting device thereon the azimuth and altitude bearings of the heavenly body focused in said sighting device may be designated on said indicators.

16. In a navigation instrument, a circular longitude indicator carrying a scale means designating the degrees of longitude with particular reference to the hourly divisions, an hour band and star chart disk revolubly mounted in concentric relation with said longitude indicator, the hour band having a scale thereon representing the hourly divisions of a day, the star chart representing principal stars of the heavens radially projected on to the celestial sphere, and a designating device revoluble about the axis of said longitude indicator, hour band and star chart disk, for designating radial lines across the same.

17. In a navigation instrument, a series of relatively revoluble, concentric bands, scale means on each of said bands radially dividing the same into fractions of a circle with particular reference to the hours of a full day, one of said scale means including longitude designating indicia, said bands being relatively shiftable to facilitate comparison between time as determined from different bases or sources and with reference to the lines of longitude and a star chart disk revolubly mounted inwardly of the innermost band and representing principal stars of the heavens radially projected on to the celestial sphere.

ERNEST H. ASHLOCK.